(12) United States Patent
Niwa et al.

(10) Patent No.: US 6,233,095 B1
(45) Date of Patent: *May 15, 2001

(54) SCREEN MEMBER FOR A REFLEX TYPE SCREEN

(75) Inventors: Masatoshi Niwa; Hajime Maruta, both of Joetsu; Masaaki Kishimoto, Ibaraki; Koji Nakamura; Koichi Wada, both of Ritoh-machi, all of (JP)

(73) Assignee: Arisawa Mfg. Co., Ltd., Niigata-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,657

(22) Filed: Jul. 27, 1998

(30) Foreign Application Priority Data

Jul. 28, 1997 (JP) .................................................. 9-201427

(51) Int. Cl.⁷ .................................................. G03B 21/56
(52) U.S. Cl. .............................................................. 359/443
(58) Field of Search .................................... 359/443, 452, 359/461, 459

(56) References Cited

U.S. PATENT DOCUMENTS

| Re. 30,892 | * | 3/1982 | Bingham et al. ................... 428/241 |
| 2,407,680 | * | 9/1946 | Palmquist et al. . |
| 3,994,086 | * | 11/1976 | Mizuochi ........................... 40/135 |
| 4,104,102 | * | 8/1978 | Eagon et al. ....................... 156/298 |
| 5,706,134 | * | 1/1998 | Konno et al. ....................... 359/599 |

FOREIGN PATENT DOCUMENTS 0 291 178 * 1/1988 (EP) .
4-321017 * 11/1992 (JP) .

* cited by examiner

Primary Examiner—Safet Metjahic
Assistant Examiner—Etienne LeRoux
(74) Attorney, Agent, or Firm—Sughrue, Mion, Zinn, Macpeak & Seas, PLLC

(57) ABSTRACT

A a screen member for a reflex type screen with a practical advantage which is simple in structure in which an image projected on the screen may be easily observed even if the image projected on the screen is observed in an oblique direction. The screen member (A) for a reflex type screen for reflecting a ray of projection light from a projecting means such as a projector contains a first layer (a) formed integrally with an inner reflex layer (2) on a surface of a base (1) and a second layer (b) formed of a deflection film (3) bonded to a surface of the first layer (a).

16 Claims, 2 Drawing Sheets

SCREEN MEMBER FOR A REFLEX TYPE SCREEN

BACKGROUND OF THE INVENTION

The present invention relates to a screen member for a reflex type screen that is simple in structure and superior in optical characteristics.

FIG. 3 shows a conventional screen member for a reflex type screen. A reflex film 21 is bonded by adhesives on a surface made of PET film (polyethylene telephthalate resin film) which serves as a base 20 of the screen. A deflection film 22 made of PETPF film (polyethylene telephthalate resin film system deflection film, more specifically, polyester system deflection plate made by mono-axis drawing and adding two-color dye to polyester resin) is bonded onto a surface of the reflex film 21 by adhesives. An OPP film (bi-axial drawn polypropylene film) is bonded by adhesives on a surface of the deflection film 22 as a random reflective film 23 for reflecting, at random, the reflex beam of light from the reflex film 21 and an incident beam of light from a projecting means such as a projector.

However, in the prior art, a large number (four) of films must be bonded by adhesives to each other. In the case where a large screen such as an 80-inch screen is to be manufactured, it is very troublesome or difficult to bond the films without creases or non-uniformity.

In addition, in the prior art, the surface of the random reflective film 23, which is the frontmost surface layer of the screen member, is formed in a corrugated manner, and the incident ray of light from the projector and the reflective ray of light from the reflex film 21 is reflected randomly so that an image projected on the screen may be observed even in a direction oblique to the screen. However, if the large size screen is designed with such an arrangement, a degree of the random reflection is too small and the image becomes dark if it is viewed in the oblique direction relative to the screen. Thus, image projected on the screen is hardly observed.

Also, the conventional system suffers from the following disadvantages. Namely, the OPP film (random reflective film 23) is a bi-axial drawn film. An axial displacement of the crystal axis is likely to occur in a width direction. The displacement between a transparent axis and the deflection film 22 used in the screen is in the width direction so that particularly, the image at the right and left end portions is likely to be dark.

SUMMARY OF THE INVENTION

Accordingly in order to overcome the above-described disadvantages, an object of the present invention is to provide a screen member for a reflex type screen with a practical advantage which is simple in structure in which an image projected on the screen may be easily observed even if the image projected on the screen is observed in an oblique direction.

According to the present invention, there is provided a screen member for a reflex type screen for reflecting a ray of projected light from a projecting means such as a projector, comprising a first portion formed integrally with an inner reflex layer on a surface of a base and a second portion formed of a deflection film is bonded to a surface of the first portion.

The surface of the inner reflex layer is formed into a corrugated surface.

An acrylic spherical beads or scale piece-like pearl pigment is mixed into the inner reflex layer.

A minimum thickness of the inner reflex layer is set in the range of 2 to 10 $\mu$m.

A metal portion is formed on the surface of the inner reflex layer.

The second layer is formed of an outer reflex layer integrally formed with a surface of the deflection film.

The surface of the outer reflex layer is formed into a corrugated surface.

Acrylic spherical beads or pearl pigment is mixed into the outer reflex layer.

A minimum thickness of the outer reflex layer is set in the range of 2 to 4 $\mu$m.

According to another aspect of the invention, there is provided a screen member for a reflex type screen for reflecting a ray of projected light from a projecting means such as a projector, comprising a first layer formed integrally with an inner reflex layer on a surface of a base, a second portion formed of a deflection film integrally with an outer reflex portion on a surface of the deflection film bonded to a surface of the first portion; a minimum thickness of the inner reflex layer is set in the range of 2 to 10 $\mu$m, acrylic spherical beads or a scale piece-like pearl pigment is mixed into the inner reflex layer, the surface of the inner reflex layer is formed into a corrugated surface; and a metal layer is formed on the surface of the inner reflex layer, a minimum thickness of the outer reflex layer is set in the range of 2 to 4 $\mu$m, acrylic spherical beads or a pearl pigment is mixed into the outer reflex layer, and the surface of the outer reflex layer is formed into a corrugated surface.

According to still another aspect of the invention, there is provided a screen member for a reflex type screen for reflecting a ray of projected light from a projecting means such as a projector, comprising a first portion formed integrally with an inner reflex layer on a surface of a polyethylene telephthalate film, and a second portion formed of a polyester system deflection plate integrally with an outer reflex layer on the surface of the polyester system deflection plate bonded to a surface of the first portion; wherein a minimum thickness of the inner reflex layer is set in the range of 2 to 10 $\mu$m, acrylic spherical beads having a particle size of 2 to 15 $\mu$m or a scale piece-like pearl pigment having a particle size of 50 to 70 $\mu$m is mixed into the inner reflex layer, the surface of the inner reflex layer is formed into and a corrugated surface; wherein a metal layer is formed on the surface of the inner reflex layer, a minimum thickness of the outer reflex layer is set in the range of 2 to 4 $\mu$m, acrylic spherical beads having a particle size of 2 to 15 $\mu$m or a pearl pigment having a particle size of 50 to 70 $\mu$m is mixed into the outer reflex layer, and the surface of the outer reflex layer is formed into a corrugated surface.

Since the screen member is composed of the first portion and the second portion which are bonded together, it is easy to be manufactured.

Since the inner reflex layer is provided on the base, there is no crease or localization of the first portion.

Since the outer reflex layer is bonded to the deflection film, there is no crease or localization of the second portion.

Since the amount of the adhesive layer is small, even if the adhesive is used for bonding the first and second portions together, the transparency of the light is improved, and the incident light may be well reflected by the inner reflex layer.

Also, since the OPP film is not used, the displacement of the axis in the transverse direction is suppressed and a uniform image having a high brightness without any non-uniformity may be seen.

Incidentally, the surfaces of the inner and outer reflex layers are corrugated so that the random reflectivity of the reflected light to the screen member is enhanced. Even if the screen may be viewed obliquely, the image projected on the screen may be seen.

With such a structure, according to the present invention, it is possible to provide a screen member for a reflex type screen which is simple in structure in which an image projected on the screen may be easily observed with practical and productive advantages, even if the image projected on the screen is observed in an oblique direction.

BRIEF DESCRIPTION OF THE DRAWINGS

In the accompanying drawings.

DESCRIPTION OF THE PREFERRED EMBODIMENTS

The present invention will now be described with reference to the accompanying drawings.

Figure 1:
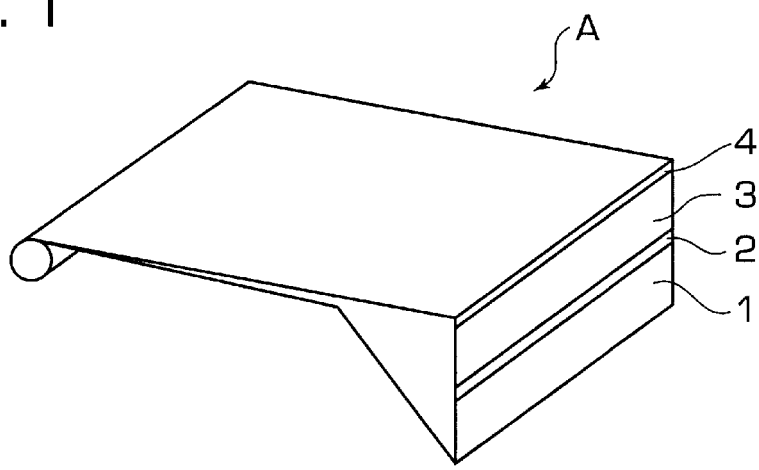
FIG. 1 is an illustrative perspective view with an enlarged portion of an embodiment of the present invention.
Figure 2:
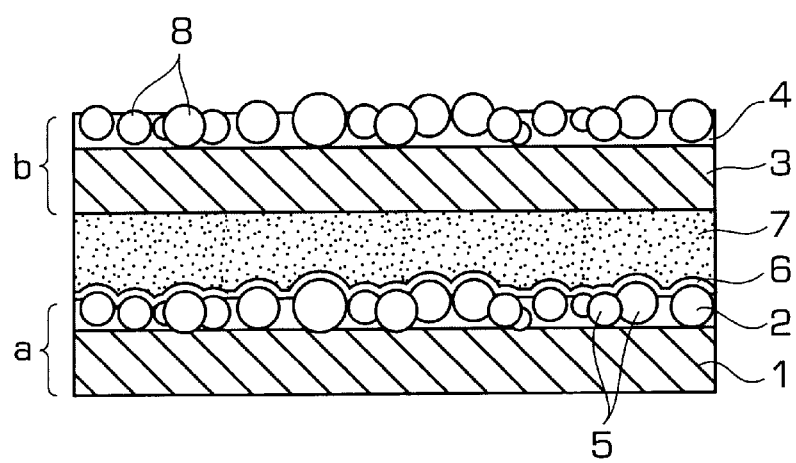
FIG. 2 is an illustrative side sectional view of the embodiment of the present invention.
Figure 3:
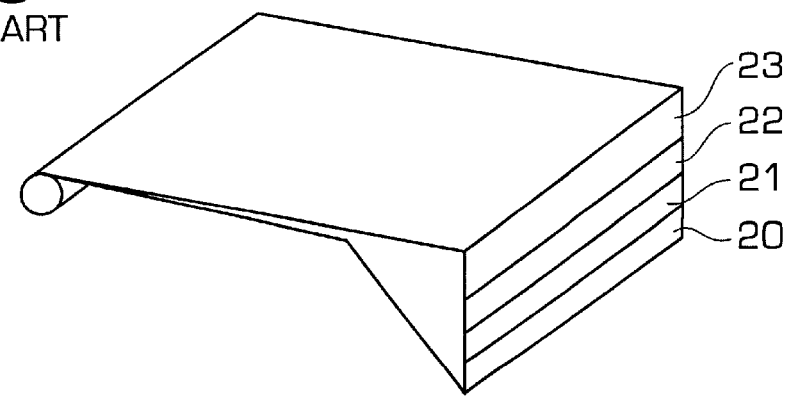
FIG. 3 is an illustrative perspective view with an enlarged portion of a conventional example.

FIGS. 1 and 2 show an embodiment of the present invention which will now be described in detail.

The present embodiment relates to a screen member A for a reflex type screen for reflecting a projected beam from a projecting means such as a projector in which a first portion formed with an inner reflex layer 2 on a surface of a base 1, and a second portion b used as a main layer, formed with a deflection film 3 bonded on a surface of the first portion a is provided.

The first portion a will be described in detail.

The base 1 of the first portion a is made of PET film in the same manner as the conventional base 20. Incidentally, any material may be used for the base 1 if it may be a support for the screen member A.

A coating, where beads 5 having a particle size of 2 to 15 μm (preferably, acrylic system or silicone system) are dispersed, is applied to a surface of the base 1. It is possible to use a scale piece-like pearl pigment (having a particle size of 50 to 70 μm) such as a mica system instead of the beads 5.

If a thickness of reflex layer 2 is too large, the inner reflex characteristics of light and the visible angle decreases or the weight of the screen member A increases. Conversely, if the thickness of the inner reflex layer 2 is too small, it is necessary to make the particle size of the beads 5 small (if the particle size of the beads 5 is large so that the corrugation of the corrugated surface is exaggerated, a part of the random reflex rays of light is directed along the screen surface so that the image becomes dark). Since it is difficult to form the beads 5 having an extremely small particle size, it is preferable that the thickness of the inner reflex layer 2 (that is, the minimum thickness of the inner reflex layer 2) be in the range of 2 to 10 μm. Incidentally, the particle size of the beads 5 is to be determined suitably in view of the thickness of the inner reflex layer 2.

A thin metal layer 6 is formed on the corrugated surface by a deposition method or a sputtering method. The metal layer 6 serves as a reflex portion for reflecting a ray of incident light from the projector. Incidentally, it is preferable that the metal layer 6 is basically made of metal having a high reflectivity such as silver or aluminum to assure accurate reflecting of the incident light from the projector.

The formed first portion a has the support layer of the screen member A and the random reflex layer for reflecting the incident light from the projector at random on the surface of the first portion a.

The second portion b will be described in detail.

The deflection film 3 of the second portion b is made of PETPF film in the same manner as the deflection film 22 of the conventional example. Incidentally, if the deflection film 3 is made of material having a high transparency and a high deflectivity, the brightness is improved.

A coating which is obtained by mixing organic resin system material with beads 8, which are the same as those described above, is applied on a surface of the deflection film 3 as an outer reflex layer 4. Accordingly, a corrugated surface is formed on the surface of the outer reflex layer 4 by the beads 8 in the same manner as in the above-described inner reflex layer 2. Incidentally, it is possible to use a pearl pigment instead of the beads 8.

The formed second portion b has the random reflex layer for reflecting the incident light from the projector at random on the surface of the second portion b and the transparent layer for passing the incident light from the projector to the surface of the first portion a.

If the above-described first portion a and second portion b are bonded together by the adhesives 7 in the same manner as in the conventional example, the screen member A is formed.

The results of the comparison experiments of the characteristics between the screen member A according to the embodiment and the conventional example will now be described.

Figure 4:
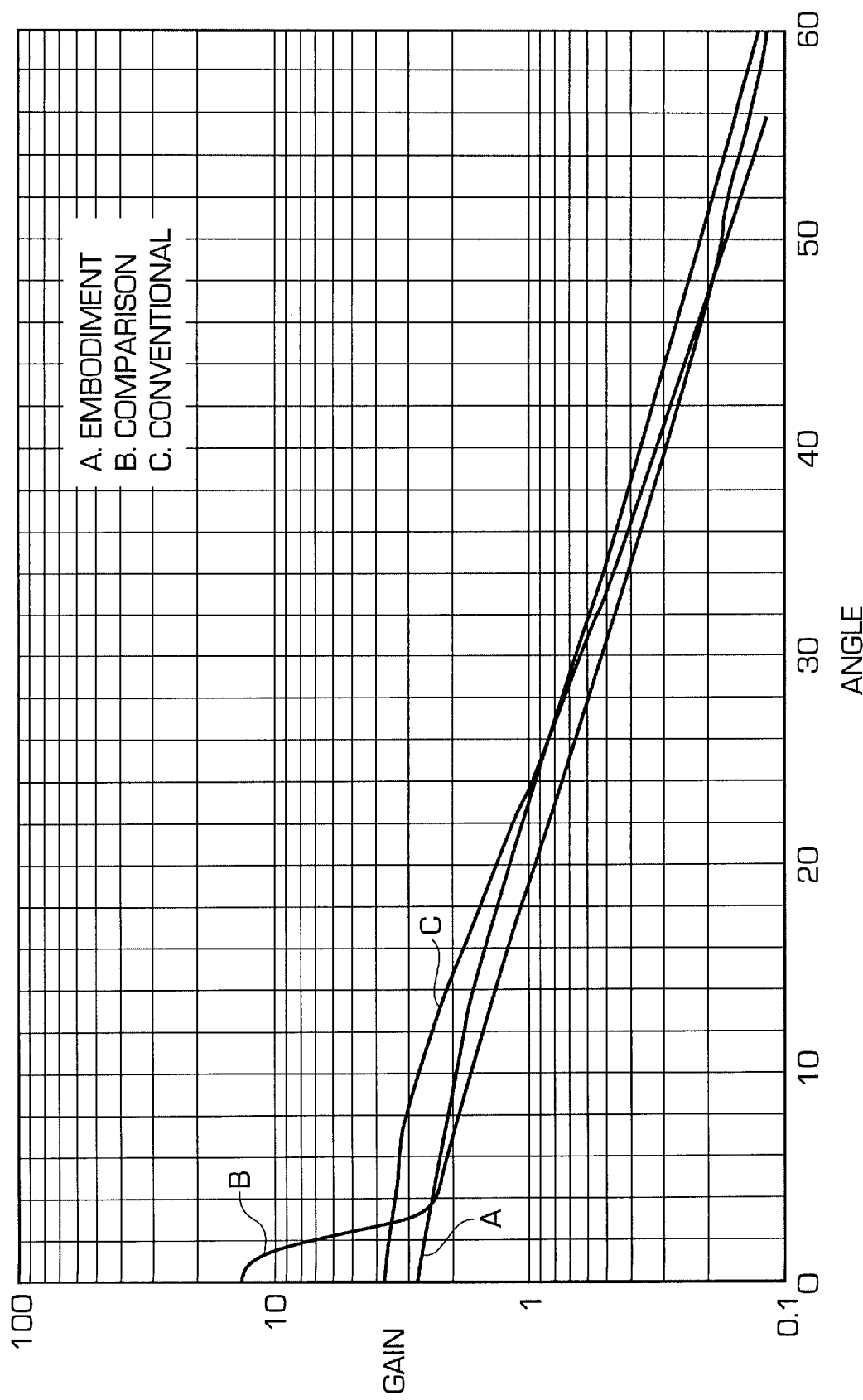
FIG. 4 is a graph showing screen optical characteristics in winding screens having 80 inches.

FIG. 4 is a graph showing a brightness or clearness of the images when the screen is viewed obliquely.

Embodiment

A coating where scale piece-like pearl pigment having a thickness of 3 to 5 μm and a length of 50 to 70 μm was dispersed uniformly at 200 PHR relative to resin mainly made of polyester/isocyanate was applied at a thickness of 4 to 5 μm by a reverse coater on one side surface of a polyester film having a thickness of 100 μm and was dried. Thereafter, aluminum was deposited at a thickness of 600 to 800 Å by a vacuum deposition method to form an inner reflex layer 2, so that a first portion a is obtained.

A coating where acrylic spherical beads having a diameter of 2 to 4 μm were dispersed uniformly at 600 PHR relative to resin mainly made of fluorine system material was applied at a thickness of 4 to 5 μm by a reverse coater to one side surface of a deflection film having a thickness of 60 μm and was dried to form an outer reflex layer 4, so that a second portion b is obtained.

The aluminum deposited surface of the first portion a and the non-coated surface of the second portion b were bonded together with polyester/isocyanate system adhesives to thereby obtain a screen member A.

Comparison Example

Instead of the scale piece-like pearl pigment used in the embodiment, silicone system spherical beads having a particle side of 2 μm or less were used to obtain a screen member by the same steps as those of the embodiment.

Conventional Example

The actual example was directed to the conventional screen member described above.

Incidentally, in the graph shown in FIG. 4, a relative brightness (gain) was plotted on an ordinate and a slant angle ($\theta$) relative to a vertical axis of the screen surface was plotted on an abscissa.

As shown in the graph, although the screen member A according to the embodiment was inferior to the conventional example or the comparison example in brightness of the image when the screen surface was viewed from the front side, the brightness thereof was improved up to, for example, about 30% at the angle=48 when the screen surface was viewed obliquely. The greater the angle, the greater the difference therebetween.

Incidentally, the embodiment was somewhat inferior at the top gain (2.8 in the embodiment, 13 in the comparison example and 3.7 in the conventional example). The standard gain was 1. However, at the gain of ½, the angle of the embodiment was 17°, that of the comparison example was 2.1° and that of the conventional example was 16°. Thus, the angle of the embodiment was substantially the same as that of the conventional example. Also, at the gain of ⅓, the angle of the embodiment was 25°, the angle of the comparison example was 2.8° and the angle of the conventional example was 21°. Thus, the embodiment was much superior in brightness or clearness of the image to the conventional example and the comparison example in the case where the screen surface was viewed obliquely.

Accordingly, the visual characteristics of the screen according to the embodiment are well utilized for the case where a large number of people observe the image thereon in a big conference room or the like.

Through an experiment in which beads 5 having a particle size of 2 to 15 µm were used instead of the scale piece-like pearl pigment used in the embodiment, it was confirmed that the visual characteristics as those of the embodiment might be obtained.

Incidentally, the comparison example has excellent visual characteristics in brightness or clearness of the image which was viewed from a front side to the screen surface. However, the decrease of the gain is too large. If the brightness of the image is adjusted for the observation in the oblique direction, the brightness is too high in the front direction.

Since the embodiment of the invention is thus constructed, it is easy to manufacture the double structure of the screen member A composed of the first portion a and the second portion b. Also, since the adhesive layer is single, the loss of light when the light is reflected by the screen member A is small so that a bright image may be obtained. The screen member for a reflex type screen is superior in practical aspect and productability.

Also, since the surfaces of the first portion a and the second portion b are corrugated, a part of the projected light from the projector is first reflected at random in a dispersed condition on the surface of the first layer a, and the rest of the light reaches the surface of the second portion b also in the dispersed condition. Furthermore, the projected light reflected in the dispersed condition on the surface of the second portion b, and the reflected light is reflected at random in the dispersed condition on the surface of the first portion a. Namely, the projection light is reflected at random over a wide angle. The image projected on the screen may be clearly seen even in an oblique direction to the screen. The screen member of the reflex type screen is thus superior in practical use.

The formation of the corrugated surfaces may readily be attained by applying to the inner reflex layer 2 and the outer reflex layer 4 a coating where the beads 5, 8 or the pearl pigments are dispersed. In addition, the degree of the corrugation of the corrugated surfaces may be designed as desired by setting a size of the beads 5, 8 or the pearl pigment. Accordingly, it is possible to obtain a screen member for a reflex type screen in which an orientation or reflectivity of the reflex light may readily be adjusted. Thus, the screen member of a reflex type screen is superior in practical aspect.

Since the reflex layer for reflecting the projection light is provided by the metal layer 6, the reflex layer may be provided without any damage to the corrugated shape of the corrugated surface provided on the inner reflex layer 2. Thus, it is possible to provide a screen member for a reflex type screen which is superior in practical aspect.

Since a thickness of the inner reflex layer 2 is set in the range of 2 to 10 µm, and a thickness of the outer reflex layer 4 is set in the range of 2 to 4 µm, almost no reflex loss occurs when the light is reflected by the screen member A, and the desired corrugated surface may be formed by the range of the particle size of the beads 5, 8 or pearl pigment in forming the corrugated surface. Thus, it is possible to provide a screen member for a reflex type screen which is superior in practical aspect.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A screen member for a reflex type screen for forming an image defined by plural rays of projected light from a projecting means, said screen member comprising:
   a first portion containing an inner reflex layer disposed over a base of said first portion; and
   a second portion containing a deflection film wherein said second portion is bonded to said first portion,
   wherein a part of said projected light from said projecting means projected onto said screen member is reflected at random in a dispersed condition on a surface of said first portions and a remainder of said projected light from said projecting means is dispersed on a surface of said second portion.

2. The screen member according to claim 1, wherein said inner reflex layer is a corrugated surface.

3. The screen member according to claim 2, wherein said inner reflex layer contains acrylic spherical beads or a scale piece-like pearl pigment.

4. The screen member according to claim 1, wherein said inner reflex layer contains acrylic spherical beads or a scale piece-like pearl pigment.

5. The screen member according to any one of claims 1, 2 and 4, wherein a minimum thickness of the inner reflex layer is in a range from 2 to 10 µm.

6. The screen member according to claim 3, wherein a minimum thickness of the inner reflex layer is in a range from 2 to 10 µm.

7. The screen member according to any one of claims 1, 2, 3, 4 and 6, further comprising a metal layer disposed over said inner reflex layer of said first portion.

8. The screen member according to claim 5, further comprising a metal layer disposed over said inner reflex layer of said first portion.

9. The screen member according to any one of claims 1, 2, 3, 4, 6 and 8, wherein said second portion contains an outer reflex layer disposed over said deflection film.

10. The screen member according to claim 9, wherein said outer reflex layer is a corrugated surface.

11. The screen member according to claim 10, wherein said outer reflex layer contains acrylic spherical beads or a scale piece-like pearl pigment.

12. The screen member according to claim 9, wherein said outer reflex layer contains acrylic spherical beads or a scale piece-like pearl pigment.

13. The screen member according to claim 11, wherein a minimum thickness of the outer reflex layer is in a range from 2 to 4 $\mu$m.

14. The screen member according to claim 9, wherein a minimum thickness of the outer reflex layer is in a range from 2 to 4 $\mu$m.

15. A screen member for a reflex type screen for forming an image defined by plural rays of projected light from a projecting means, said screen member comprising:

a first portion containing an inner reflex layer disposed over a base of said first portion; and a second portion containing an outer reflex layer disposed over a deflection film, said second portion is bonded to said first portion, wherein a minimum thickness of said inner reflex layer is in a range from 2 to 10 $\mu$m, said inner reflex layer contains acrylic spherical beads or a scale piece-like pearl pigment, said inner reflex layer is a corrugated surface, and a metal layer is disposed over said inner reflex layer, wherein a minimum thickness of said outer reflex layer is in a range from 2 to 4 $\mu$m, said outer reflex layer contains acrylic spherical beads or a pearl pigment, and said outer reflex layer is a corrugated surface, and wherein a part of said projected light from said projecting means projected onto said screen member is reflected at random in a dispersed condition on a surface of said first portion, and a remainder of said projected light from said projecting means is dispersed on a surface of said second portion.

16. A screen member for a reflex type screen for forming an image defined by plural rays of projected light from a projecting means, said screen member comprising:

a first portion containing an inner reflex layer disposed over a polyethylene telephthalate film on said first portion; and a second portion containing an outer reflex layer disposed over a polyester system deflection plate, said second portion is bonded to said first portion, wherein a minimum thickness of said inner reflex layer is in a range from 2 to 10 $\mu$m, said inner reflex layer contains acrylic spherical beads having a particle size of 2 to 15 $\mu$m or a scale piece-like pearl pigment having a particle size of 50 to 70 $\mu$m, said inner reflex layer is a corrugated surface, and a metal layer is disposed over said inner reflex layer, wherein a minimum thickness of said outer reflex layer is in a range from 2 to 4 $\mu$m, said outer reflex layer contains acrylic spherical beads having a particle size of 2 to 15 $\mu$m or a pearl pigment having a particle size of 50 to 70 $\mu$m, and said outer reflex layer is a corrugated surface; and wherein a part of said projected light from said projecting means projected onto said screen member is reflected at random in a dispersed condition on a surface of said first portion, and a remainder of said projected light from said projecting means is dispersed on a surface of said second portion.

* * * * *

UNITED STATES PATENT AND TRADEMARK OFFICE
CERTIFICATE OF CORRECTION

PATENT NO.     : 6,233,095 B1                                        Page 1 of 1
DATED          : May 15, 2001
INVENTOR(S)    : Masatoshi Niwa et al.

It is certified that error appears in the above-identified patent and that said Letters Patent is hereby corrected as shown below:

Column 2,
Line 3, change "portion" to -- layer --;
Lines 5 and 17, change "layer" to -- portion --;
Line 18, after "base", insert -- and --;
Line 21, after "portion;", insert -- wherein --;
Line 25, after "and", insert -- wherein --;
Line 44, delete "and";
Line 45, after "surface;" insert -- and --; delete "wherein";
Line 46, after "layer,", insert -- wherein --;

Column 3,
Line 35, before "formed", insert -- "a" --;
Line 36, change "b" to -- "b" --;
Lines 37 and 39, change "a" (second occurrence) to -- "a" --;
Line 40, change "a" to -- "a" --;
Line 51, before reflex", insert -- "inner" --;

Column 4,
Lines 6, 9, 29, 30, and 58, change "a" to -- "a" --;
Lines 10, 11, 27, 31, 57 and 59, change "b" to -- "b" --;
Line 25, after "The", insert -- thus --; change "b" to -- "b" --;
Line 50, change "a" (second occurrence) to -- "a" --;

Column 5,
Lines 48, 54 and 63, change "a" to -- "a" --;
Lines 49, 55, 58 and 61, change "b" to -- "b" --;
Line 57, change "layer a," to -- portion; "a" --;

Signed and Sealed this

Sixth Day of May, 2003

JAMES E. ROGAN
*Director of the United States Patent and Trademark Office*